United States Patent
Suyama et al.

[11] Patent Number: 6,123,027
[45] Date of Patent: Sep. 26, 2000

[54] SELF-PROPELLED VEHICLE WITHIN PIPE

[75] Inventors: Kiichi Suyama, Yokohama; Seiji Mizukami, Kodaira; Toshihide Kawabe; Yoshio Ido, both of Kure, all of Japan

[73] Assignees: Tokyo Gas Co., Ltd.; CXR Corporation, both of Japan

[21] Appl. No.: 09/212,398

[22] Filed: Dec. 16, 1998

[51] Int. Cl.[7] .................................................. B61B 13/10
[52] U.S. Cl. ......................................................... 104/138.2
[58] Field of Search .............................. 104/138.1, 138.2

[56] References Cited

U.S. PATENT DOCUMENTS

| | | | |
|---|---|---|---|
| 3,089,434 | 5/1963 | Andreasen | 104/138.2 |
| 4,055,315 | 10/1977 | Gvelesiani et al. | 104/138.2 |
| 4,722,001 | 1/1988 | Rohrich et al. | 358/100 |
| 5,142,989 | 9/1992 | Suzumori et al. | 104/138.2 |
| 5,375,530 | 12/1994 | Zollinger et al. | 104/138.2 |
| 5,749,397 | 5/1998 | Molaug | 104/138.2 |

FOREIGN PATENT DOCUMENTS 9295573  11/1997  Japan .

*Primary Examiner*—S. Joseph Morano
*Assistant Examiner*—Lars A. Olson
*Attorney, Agent, or Firm*—Lorusso & Loud

[57] ABSTRACT

A running apparatus within a pipe runs such that a center axis of a main body of the running apparatus is automatically coincided with a center axis of the pipe during running, and smoothly runs within a curved pipe. The running apparatus comprises two pairs of wheel supporting arms (3a, 3a', 3b, 3b') having an end rotatably fixed to an end portion of the main body (1) of the running apparatus, a wheel for driving the running (5) fixed to each of the other ends of two pairs of wheel supporting arms and rotated by a drive mechanism (a motor), an interlocking mechanism (a slider and a link) provided with a spring for urging two pairs of wheel supporting arms to which the wheels for driving the running are fixed in such a manner as to open around the one end of the main body of the running apparatus, a rotational potentiometer for measuring an angle of incline of each of two pairs of wheel supporting arms so as to output a data of an angle of incline and an attitude control portion (20) for returning an attitude of the main body of the running apparatus to a normal attitude state by controlling the drive mechanism on the basis of the data of the angle of incline with respect to each of two pairs of wheel supporting arms output from the rotational potentiometer.

7 Claims, 10 Drawing Sheets

FIG. 1
(a)
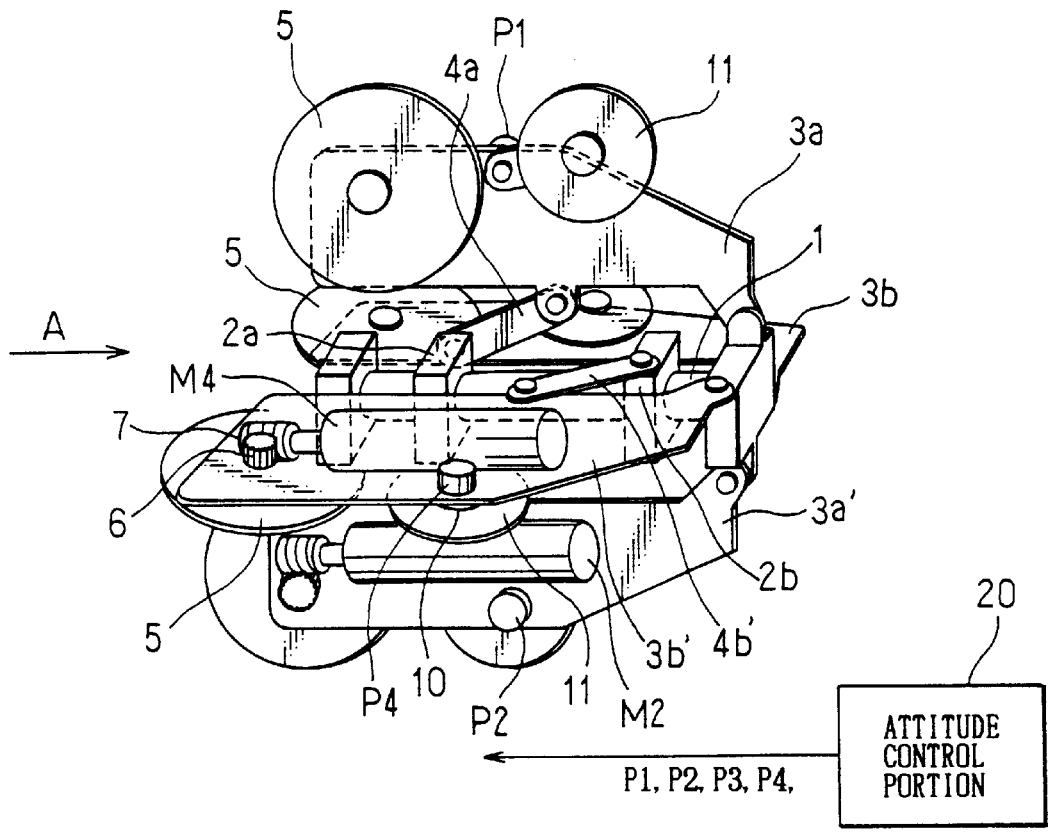
(b)
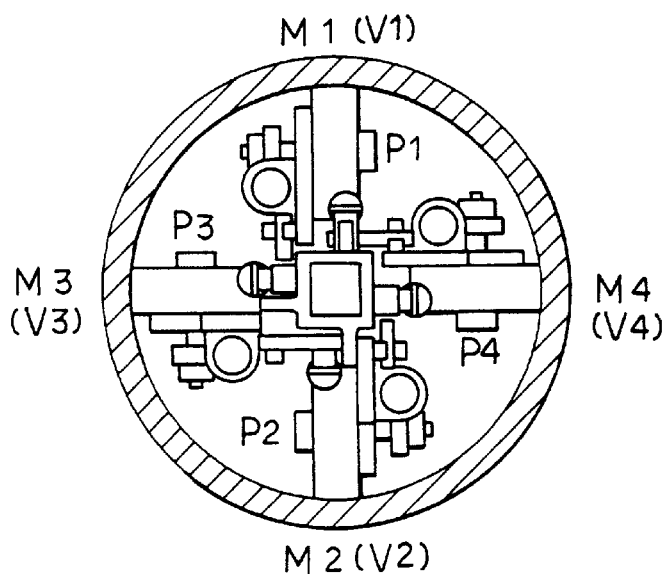

F I G. 5
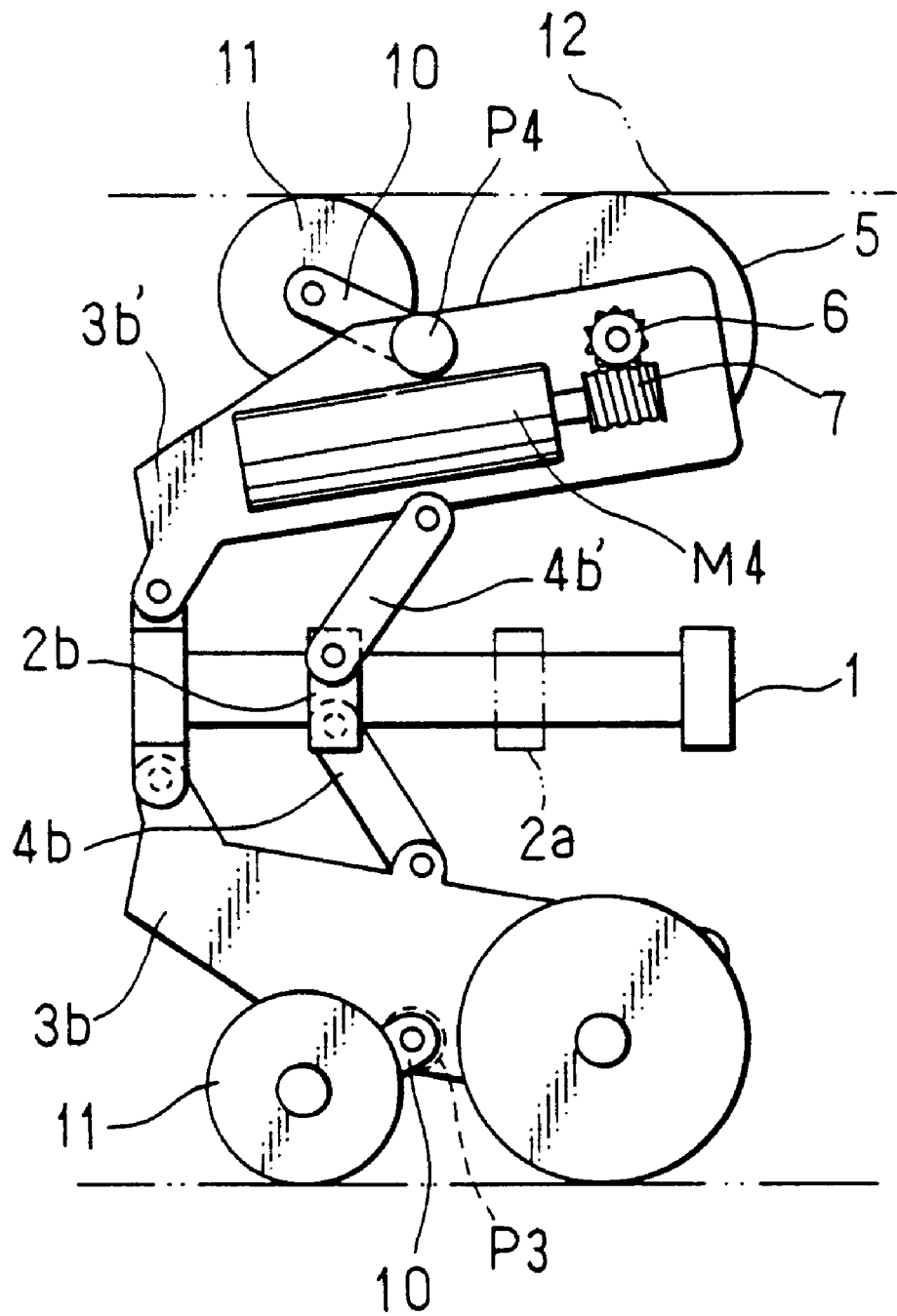

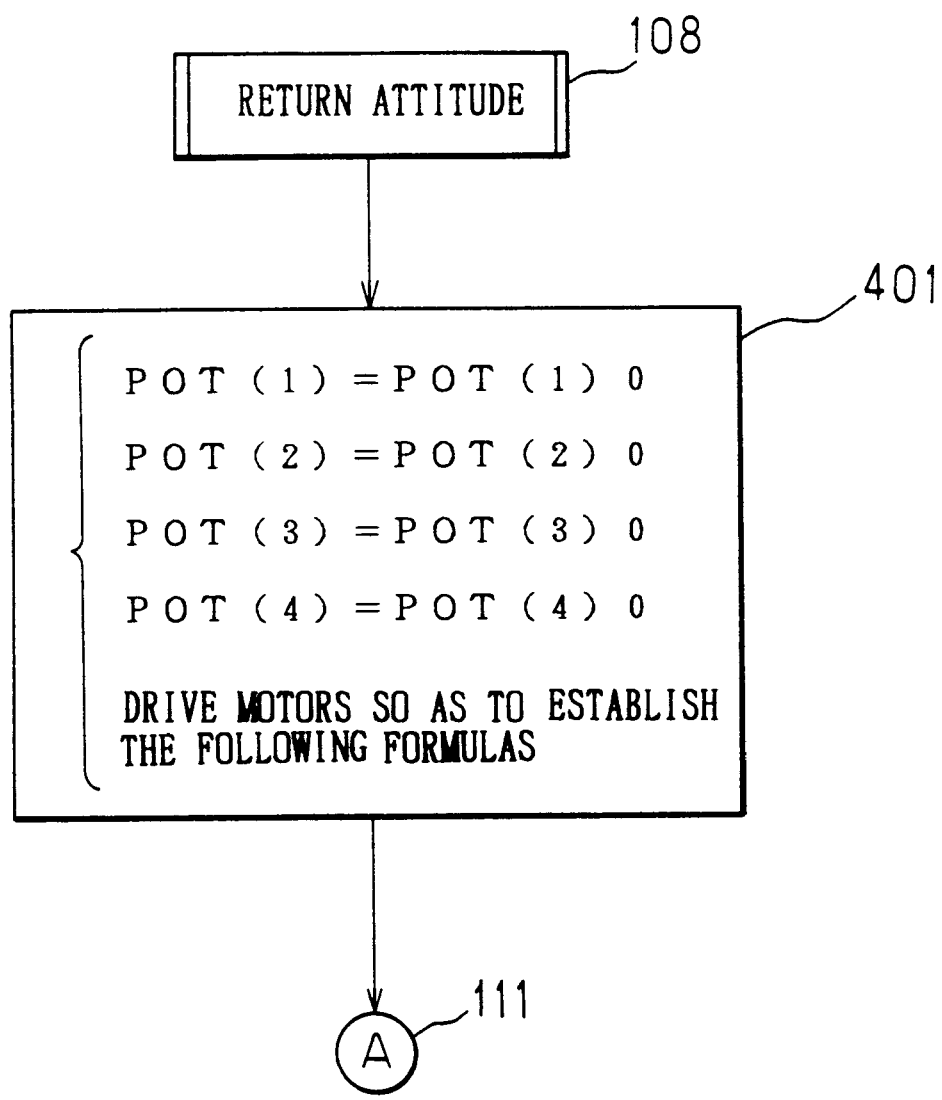

SELF-PROPELLED VEHICLE WITHIN PIPE

BACKGROUND OF THE INVENTION

1. Field of the Invention

The invention relates to a running apparatus within a pipe which is applied to a maintenance inspection and a repair operation within a pipe in an underground piping for a city gas and a pipe construction for various kinds of plants, and more particularly to a running apparatus within a pipe suitable for running within a curved pipe.

2. Description of the Related Art

For example, in a supply system for a city gas, most of gas pipes called as a main pipe is a pipe having a diameter 10 mm to 200 mm, and an extending distance thereof is ten thousands km or more, so that a mechanism of moving a sensor within the pipes is unavoidable for maintaining and inspecting the pipes. Further, the gas pipes are frequently provided under a main road, and it is necessary to reduce a number of excavating the pipes in view of influence to a traffic and a cost reduction, so that it is desired to develop a running apparatus which can move the sensor within the pipes as long as possible.

The running apparatus of this type includes a push type, a pressurizing type and a self-propelled type, and the self-propelled type particularly has an excellent performance in comparison with the push type and the pressurizing type since it has its own drive force. This self-propelled apparatus includes a crawler type, a wheel type, a peristalsis type and a walk type, and the wheel type is advantageous in view of making a size compact and a fast moving speed.

However, in this wheel type running apparatus, there is a problem that a sufficient control can not performed at a time of passing through a curved pipe so called an elbow, so that a center axis of the running apparatus does not coincide with a pipe axis of the curved pipe. Particularly, in a pipe having a different diameter called a miter bend, since a shape of the pipe is suddenly changed, there is a risk that an attitude of the running apparatus is crumbled and the running apparatus can not run.

Further, in the wheel type running apparatus having no steering mechanism, there is a risk that the running apparatus can not avoid an obstacle within the pipe and can not run in some cases. In this case, when mounting a steering mechanism to the wheel type running apparatus, an increase of a weight of the running apparatus and a complication of a shape of the apparatus are caused, so that not only a motion performance is reduced but also a reduction of an economical efficiency is caused.

Still further, in spite that understanding the shape of the pipe passage is indispensable information for maintaining the pipe, in the case of an old pipe, the drawings at a time of building are not sufficiently prepared and a history of changing the pipe is not clear, so that there are many cases that the shape of the pipe passage to which the running apparatus is applied can not be accurately understood.

SUMMARY OF THE INVENTION

The invention is made in order to solve the conventional problems mentioned above, and relates to a running apparatus within a pipe in which a running performance can be improved by always coinciding a center axis of a main body of the running apparatus with a center axis of the pipe during running and smoothly running within a curved pipe.

Further, the invention relates to a running apparatus within a pipe in which a shape of a pipe passage can be understood by measuring a running distance and a running direction of a self-propelled vehicle itself.

In order to achieve the objects mentioned above, in accordance with the invention, there is provided a running apparatus within a pipe having a self-propelled vehicle comprising:

a main body of the running apparatus;

two pairs of wheel supporting arms arranged on an outer periphery of the main body of the running apparatus in a perpendicular state and having an end rotatably fixed to an end portion of the main body of the running apparatus;

a wheel for driving the running fixed to each of the other ends of the two pairs of wheel supporting arms and rotated by a drive mechanism;

an interlocking mechanism provided with a spring for urging the two pairs of wheel supporting arms to which the wheels for driving the running are fixed in such a manner as to open around the one end of the main body of the running apparatus;

an angle measuring mechanism for measuring an angle of incline of each of the two pairs of wheel supporting arms opened by the interlocking mechanism so as to output a data of an angle of incline; and an attitude control portion for returning an attitude of the main body of the running apparatus to a normal attitude state by controlling the drive mechanism for rotating the wheel for driving the running on the basis of the data of the angle of incline with respect to each of the two pairs of wheel supporting arms output from the angle measuring mechanism.

Further, in the running apparatus within the pipe in accordance with the invention, it is preferable that the attitude control portion has an attitude returning control function for automatically correcting the attitude of the main body of the running apparatus in parallel to the pipe axis of the pipe within which the running apparatus runs on the basis of the data of the angle of incline.

Still further, in the running apparatus within the pipe in accordance with the invention, it is preferable that the attitude control portion has a steering control function for automatically swinging the main body of the running apparatus in a circumferential direction of the pipe within which the running apparatus runs on the basis of the data of the angle of incline.

Furthermore, in the running apparatus within the pipe in accordance with the invention, it is preferable that the attitude control portion has an external command control function for controlling the drive mechanism for rotating the wheel for driving the running on the basis of a command from an external portion.

Moreover, in the running apparatus within the pipe in accordance with the invention, it is preferable that the angle measuring mechanism comprises a rotational potentiometer fixed to each of the two pairs of wheel supporting arms, an arm for measuring an angle axially attached to a rotational axis of the potentiometer and projected from each of the wheel supporting arms, a roller for measuring an angle rotatably fixed to a front end portion of the arm for measuring the angle and a spring for always urging the arm for measuring the angle to a predetermined rotational direction around a rotational axis of the rotational potentiometer so as to pressure contact the roller for measuring the angle to a wall of the pipe within which the running apparatus runs.

Further, in the running apparatus within the pipe in accordance with the invention, it is preferable that measuring means for measuring a moving distance of the self-propelled vehicle is provided in the wheel for driving the running.

Further, in the running apparatus within the pipe in accordance with the invention, it is preferable that in the case that a plurality of the self-propelled vehicles are connected, the attitude control portion of each of the self-propelled vehicles is connected to each other so as to send and receive a control signal.

In the running apparatus within the pipe mentioned above, the wheel for driving the running fixed to each of the other ends of two pairs of wheel supporting arms and rotated by the drive mechanism is urged to a direction of the wall surface within the pipe by the spring in the interlocking mechanism and pressure contacted to the inner wall of the pipe. Accordingly, the self-propelled vehicle itself can be moved within the pipe by driving each of the wheels for driving the running by the drive mechanism in this state.

Further, in this state, since the roller for measuring the angle rotatably fixed to the front end portion of the arm for measuring the angle as the angle measuring mechanism is always pressure contacted to the inner wall of the pipe by the urge of the spring, the rotational potentiometer to which the arm for measuring the angle is axially attached outputs a data of an angle of incline in correspondence to an angle formed between the arm for measuring the angle and the wheel supporting arm. The angle corresponds to an angle formed between the main body of the running apparatus and the pipe.

Accordingly, when each of the wheels for driving the running is driven by controlling the drive mechanism by the attitude control portion so that angles measured by the respective angle measuring mechanisms of a pair of wheel supporting arms opposing to each other are equal to each other, the main body of the running apparatus is always directed to an axial direction of the pipe at every portion in the straight pipe portions and the curved pipe portions, and can automatically run within the pipe in this state. Since a difference in a route length of each of the wheels for driving the running in the curved pipe portions can be absorbed by a difference in a drive distance of each of the wheels for driving the running, no slip is generated.

Further, in some cases, when each of the wheels for driving the running is driven so that angles measured by the angle measuring mechanism of each of a pair of wheel supporting arms opposing to each other satisfy a fixed rate, the main body of the running apparatus can be made in a state of being inclined from the axial direction of the pipe at a predetermined angle. Accordingly, the main body of the running apparatus running in this inclined state or to the axial direction of the pipe can be inclined at a desired portion.

BRIEF DESCRIPTION OF THE DRAWINGS

FIG. 1A is a perspective view which shows an embodiment of a running apparatus within a pipe in accordance with the invention;

FIG. 1B is a view as seen from an arrow A in FIG. 1A;

FIG. 5 is a partly plan view in which another part of basic components of the running apparatus within the pipe shown in FIG. 1 is taken out;

FIG. 11 is a flow chart which shows an external command control system for controlling a drive mechanism in accordance with a command from an external portion.

DESCRIPTION OF THE PREFERRED EMBODIMENTS

An embodiment of a running apparatus within a pipe in accordance with the invention will be described below with reference to the accompanying drawings.

An embodiment of a running apparatus within a pipe in accordance with the invention has, as shown in FIGS. 1A and 1B, a self-propelled vehicle comprising a main body 1 of the running apparatus, two pairs of wheel supporting arms 3a, 3a', 3b and 3b' arranged on an outer periphery of the main body 1 of the running apparatus in a perpendicular state, four wheels for driving the running 5 fixed to the respective other ends of two pairs of wheel supporting arms 3a, 3a', 3b and 3b', an interlocking mechanism provided with a spring for urging two pairs of wheel supporting arms 3a, 3a', 3b and 3b' to which the wheels for driving the running 5 are fixed in such a manner as to radially open around an end of the main body 1 of the running apparatus and an angle measuring mechanism for measuring an angle of incline of each of two pairs of wheel supporting arms 3a, 3a', 3b and 3b' radially opened by the interlocking mechanism so as to output data d1, d2, d3 and d4 of an angle of incline. The main body 1 of the running apparatus is formed by a rod-shaped body, and a pair of sliders 2a and 2b having the rod-shaped main body 1 of the running apparatus as a common rail portion are supported so as to freely move in an axial direction.

Figure 2:
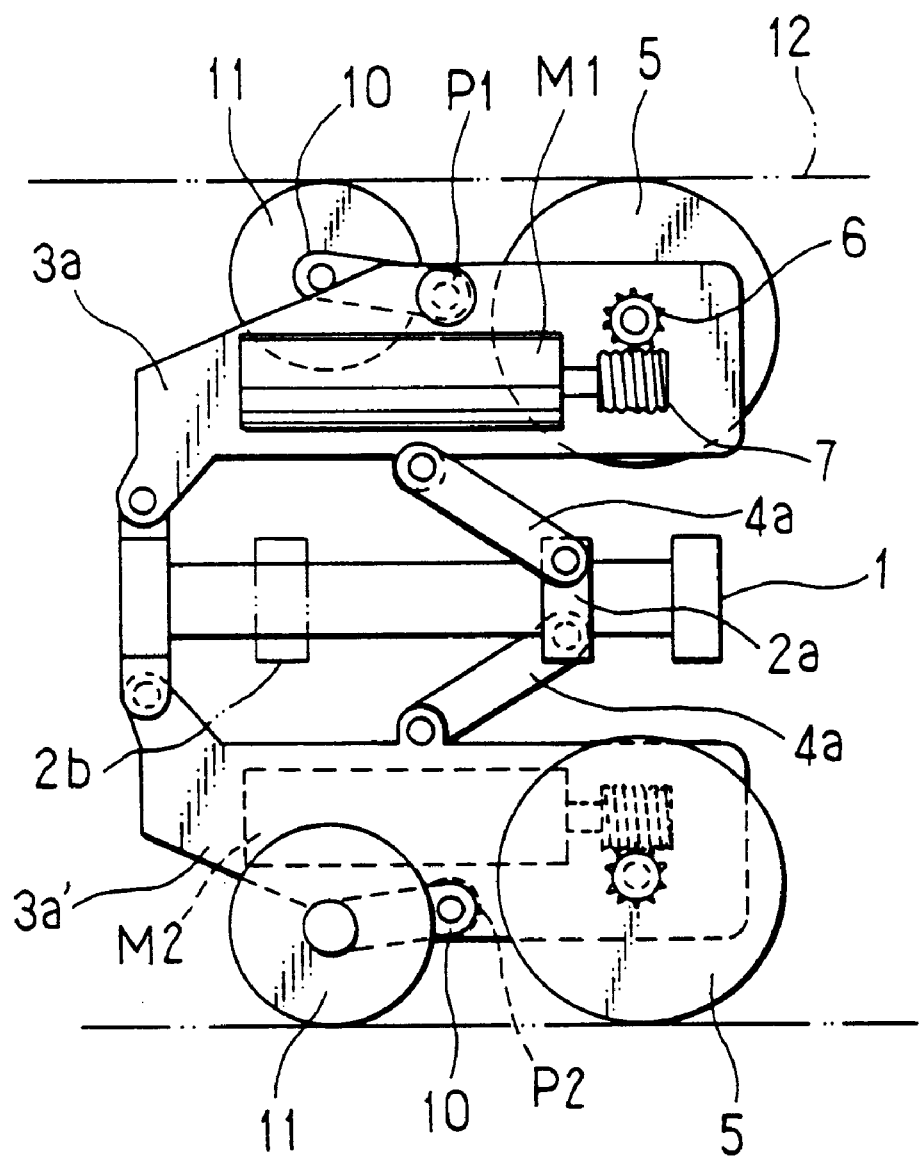
FIG. 2 is a partly side elevational view in which a part of basic components of the running apparatus within the pipe shown in FIG. 1 is taken out.
Figure 3:
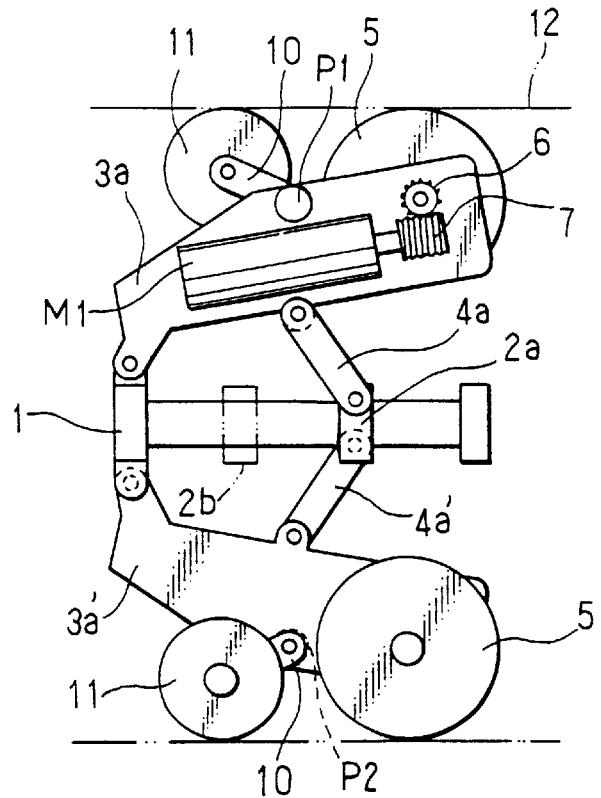
FIG. 3 is a partly side elevational view in which a part of basic components of the running apparatus within the pipe shown in FIG. 1 is taken out.

A pair of wheel supporting arms 3a and 3a' in one side are structured such that an end portion thereof is rotatably fixed to an end portion of the main body 1 of the running apparatus in an opposing state, as shown in FIGS. 2 and 3. Further, links 4a and 4a' are connected between a pair of wheel supporting arms 3a and 3a' in the one side and the slider 2a positioned at the other end side apart from the one end side of the main body 1 of the running apparatus. Accordingly, when the slider 2a moves leftward from the state shown in FIG. 2, each of the wheel supporting arms 3a and 3a' is opened to an inner wall of a pipe 12 in an interlocking manner as shown in FIG. 3, and when the slider 2a moves in an inverted direction, they are closed from the state shown in FIG. 3 to the state shown in FIG. 2. Accordingly, the slider 2a and the links 4a and 4a' constitute an interlocking mechanism. Since the spring (not shown) for urging the slider 2a to a left side in FIG. 2 is provided between the slider 2a and the main body 1 of the running apparatus, a pair of wheel supporting arms 3a and 3a' are urged by the spring so as to open to the inner wall of the pipe 12 in an interlocking manner. In this case, a structure and an arranged position of the spring is optional.

Figure 4:
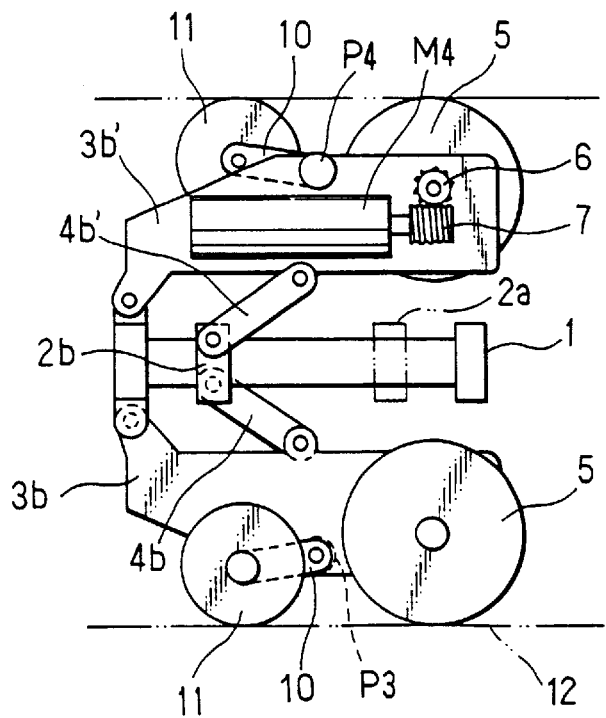
FIG. 4 is a partly plan view in which another part of basic components of the running apparatus within the pipe shown in FIG. 1 is taken out.

A pair of wheel supporting arms 3b and 3b' in the other side are arranged in perpendicular to a pair of wheel supporting arms 3a and 3a' in the one side (refer to FIG. 1A), and as shown in FIGS. 4 and 5 an end thereof is rotatably fixed to the end portion of the main body 1 of the running apparatus in an opposing state. Further, links 4b and 4b' are connected between a pair of wheel supporting arms 3b and 3b' in the other side and the slider 2b positioned at the one end side of the main body 1 of the running apparatus. Accordingly, when the slider 2b moves rightward from the state shown in FIG. 4, each of the wheel supporting arms 3b and 3b' is opened to the inner wall of the pipe 12 in an interlocking manner as shown in FIG. 5, and when the slider 2b moves in an inverted direction, they are closed from the state shown in FIG. 5 to the state shown in FIG. 4. Accordingly, the slider 2b and the links 4b and 4b' constitute an interlocking mechanism as well as a pair of wheel supporting arms 3a and 3a' in the one side. Since the spring (not shown) for urging the slider 2b to a right side in FIG. 4 is provided between the slider 2b and the main body 1 of the running apparatus, a pair of wheel supporting arms 3b and 3b are urged by the spring so as to open to the inner wall of the pipe 12 in an interlocking manner. In this case, a structure and an arranged position of the spring is optional.

The wheel for driving the running 5 is structured such that a coefficient of friction becomes great by suitable means such as printing an urethane rubber to an outer periphery of a metal wheel. The wheel for driving the running 5 is driven by a drive mechanism. The drive mechanism is provided in each of the wheel supporting arms 3a, 3a', 3b and 3b', and is structured such that a worm wheel 6 is provided in a rotational axis of each of the wheels for driving the running 5 and motors M1, M2, M3 and M4 each provided with a worm 7 engaged with the worm wheel 6 are provided. Accordingly, each of the wheels for driving the running 5 can be rotated through the worm 7 and the worm wheel 6 by driving each of the motors M1, M2, M3 and M4 so as to perform a running.

The angle measuring mechanism comprises rotational potentiometers P1, P2, P3 and P4 respectively fixed to two pairs of wheel supporting arms 3a, 3a', 3b and 3b', arms 10 for measuring an angle axially attached to a rotational axis of the rotational potentiometers P1, P2, P3 and P4 and projected from the respective wheel supporting arms 3a, 3a', 3b and 3b', and a roller 11 for measuring an angle rotatably fixed to a front end portion of each of the arm 10 for measuring the angle. Further, there is provided a spring (not shown) for always urging the arm 10 for measuring the angle to a predetermined rotational direction around a rotational axis of each of the rotational potentiometer P1, P2, P3 and P4 so as to pressure contact the roller 11 for measuring the angle to a wall of the pipe 12 within which the running apparatus runs.

Figure 6:
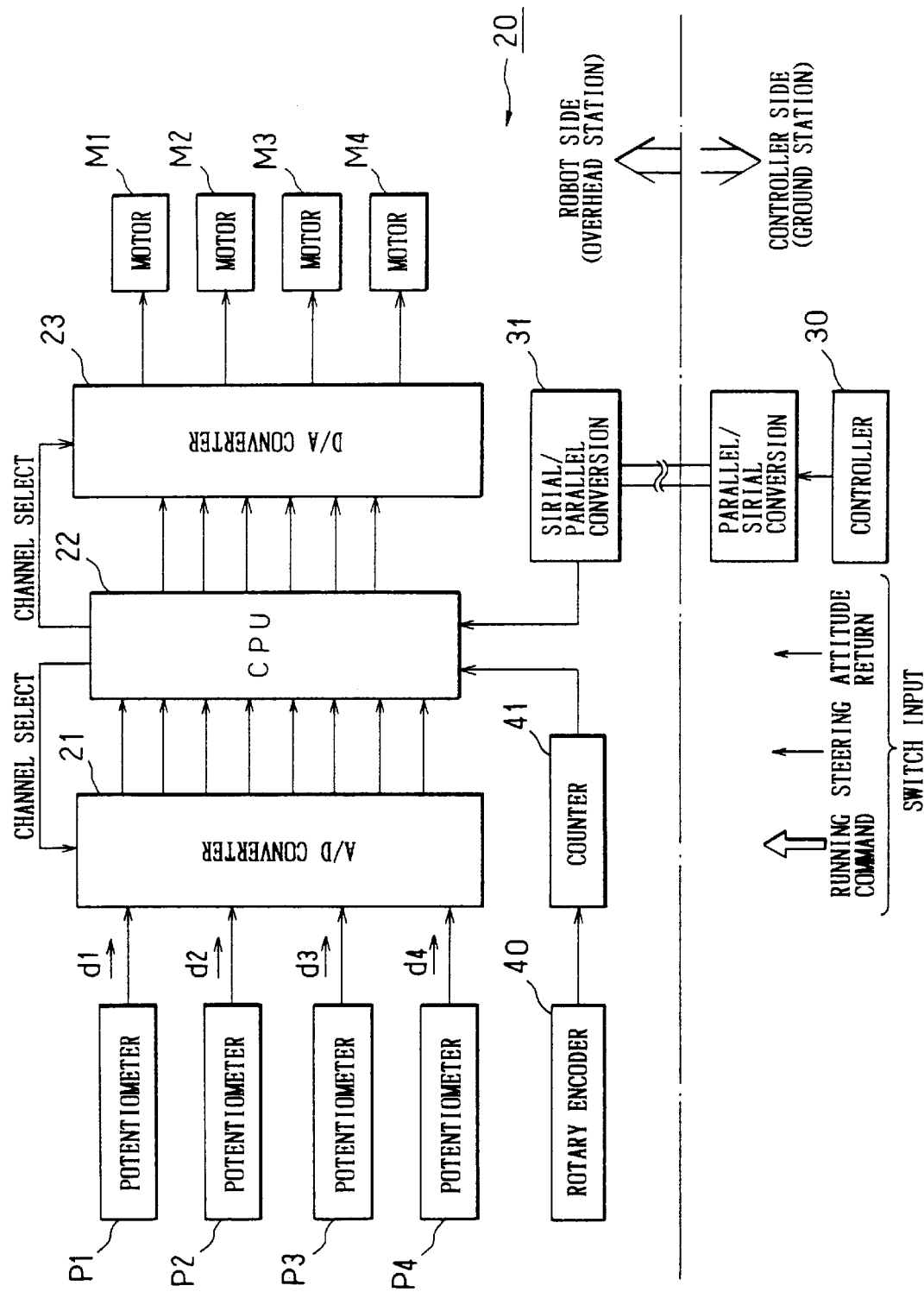
FIG. 6 is a control block view which shows an attitude control portion used for a running apparatus within a pipe in accordance with the invention.

Further, the running apparatus within the pipe is provided with an attitude control portion 20 for controlling the motors M1, M2, M3 and M4 in the drive mechanism for rotating the respective wheels for driving the running 5 on the basis of the data d1, d2, d3 and d4 of the angle of incline output from the rotational potentiometers P1, P2, P3 and P4 in the respective angle measuring mechanisms. The attitude control portion is installed therein as shown in FIG. 6, an A/D converter 21 for converting each of the data d1 and d2 of the angle of incline corresponding to analogue signals from the rotational potentiometers P1 and P2 provided in a pair of wheel supporting arms 3a and 3a' in the one side and each of the data d3 and d4 of the angle of incline corresponding to analogue signals from the rotational potentiometers P3 and P4 provided in a pair of wheel supporting arms 3b and 3b' in the other side to digital signals, a CPU 22 for processing a calculation for returning an attitude of the main body 1 of the running apparatus to a normal attitude state by controlling the motors M1, M2, M3 and M4 in the drive mechanism for rotating each of the wheels for driving the running 5 on the basis of each of the data d1, d2, d3 and d4 of the angle of incline after converted to the digital signals in the A/D converter 21, and a D/A converter 23 for converting a motor control data corresponding to a digital signal and calculated in the CPU 22 to an analogue signal.

The CPU 22 has an attitude control function for automatically correcting the attitude of the main body 1 of the running apparatus on the basis of each of the data d1, d2, d3 and d4 of the angle of incline so as to be in parallel to the axis of the pipe within which the apparatus runs. A control program of the attitude control function is made such that in a normal running in a straight pipe, the main body 1 of the running apparatus is in parallel to the pipe axis on the basis of the data d1, d2, d3 and d4 of the angle of incline out put from the rotational potentiometers P1, P2, P3 and P4 rotatably fixed to the respective angle measuring rollers 11 by the links 4a, 4a, 4b and 4b. In particular, since lines are connected so that a potential voltage corresponding to each of the data d1, d2, d3 and d4 of the angle of incline of the rotational potentiometers P1, P2, P3 and P4 ascends when each of the rollers 11 for measuring the angle is contracted, and descends when being free, in the case that the main body 1 of the running apparatus is inclined and, for example, an output voltage of the rotational potentiometer P1 ascends, the control program of the attitude control function in the CPU 22 calculates for increasing a rotational speed of the motor M1 so that the following formulas are established.

$$\Delta Va = \{POT(1) - POT(1)0\} - \{POT(2) - POT(2)0\} \quad (1)$$

$$\Delta Vb = \{POT(3) - POT(3)0\} - \{POT(4) - POT(4)0\} \quad (2)$$

$$V[1] = [\text{STANDARD SPEED}] + k\Delta Va \quad (3)$$

$$V[2] = [\text{STANDARD SPEED}] - k\Delta Vb \quad (4)$$

$$V[3] = [\text{STANDARD SPEED}] + k\Delta Va \quad (5)$$

$$V[4] = [\text{STANDARD SPEED}] - k\Delta Va \quad (6)$$

In which POT(1) is a data d1 of an angle of inline (a potential voltage) output from the rotational potentiometer P1, POT(2) is a data d2 of an angle of inline (a potential voltage) output from the rotational potentiometer P2, POT (3) is a data d3 of an angle of inline (a potential voltage) output from the rotational potentiometer P3, POT(4) is a data d4 of an angle of incline (a potential voltage) output from the rotational potentiometer P4, POT(1)0, POT(2)0, POT(3)0 and POT(4)0 are standard potential voltage, $\Delta Va$ and $\Delta Vb$ are control potential voltage, V[1] is a voltage of a speed of the motor M1, V[2] is a voltage of a speed of the motor M2, V[3] is a voltage of a speed of the motor M3, V[4] is a voltage of a speed of the motor M4, and k is a constant of gain. The same definition will be applied to the following description.

On the contrary, since the potential voltage of the rotational potentiometer P2 opposed to the rotational potentiometer P1 descends, the rotational speed of the motor M2 is made small by the voltage V[2] of the speed of the motor M2 introduced on the basis of the control program of the attitude control function in the CPU 22.

Accordingly, since the angle formed between the arms 10 for measuring the angle in a pair of wheel supporting arms 3a and 3a' and the angle formed between a pair of wheel supporting arms 3a and 3a, are equal to each other, the main body 1 of the running apparatus is always directed to an axial direction of the pipe at any portions of the straight pipe portions and the curved pipe portions and can automatically run within the pipe in this state when controlling the drive mechanism by means of the attitude control portion 20 so as to drive each of the wheels for driving the running 5. The angle corresponds to the angle formed between the main body 1 of the running apparatus and the pipe. Further, since a difference in a route length of each of the wheels for driving the running 5 at the curved pipe portion is absorbed by a difference in a moving distance of each of the wheels for driving the running 5, no slip is generated.

In this case, the motors M3 and M4 drives the self-propelled vehicle in a normal manner by controlling the rotational speed so as to drive each of the wheels for driving the running 5 in the same manner as mentioned above.

Further, at a time of running in the elbow (the curved pipe), there is a case that a control by the attitude control function cannot be performed due to a sudden change. In this case, the CPU 22 automatically corrects the attitude of the main body 1 of the running apparatus so as to be in parallel to the axis of the pipe within which the running apparatus runs in accordance with the control program of the attitude returning control function. In particular, in the case that the potential voltage from any one of the rotational potentiometers changes to a level equal to or more than a fixed level with respect to the predetermined standard potential voltage, the running is stopped. That is, by detecting the wheel for driving the running 5 controlled by the potential voltage from the rotational potentiometer over the standard potential voltage, a calculation is performed so that the following formulas are established.

$$POT(1)=POT(1)0 \quad (7)$$
$$POT(2)=POT(2)0 \quad (8)$$
$$POT(3)=POT(3)0 \quad (9)$$
$$POT(4)=POT(4)0 \quad (10)$$

Figure 7:
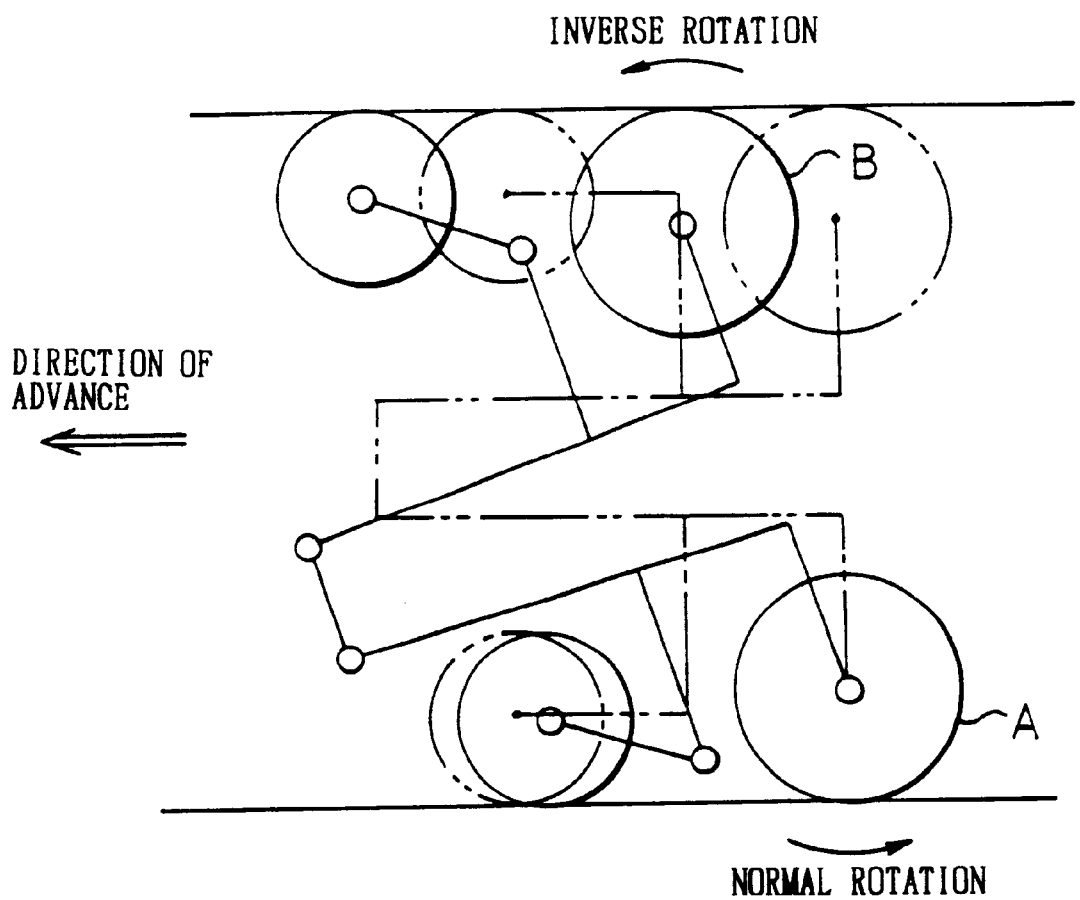
FIG. 7 is a schematic view which shows an attitude return state of a self-propelled vehicle in a running apparatus within a pipe in accordance with the invention.

Accordingly, the wheel for driving the running A is normally rotated as shown in FIG. 7, and the opposing wheel for driving the running B is counter rotated. At this time, the other pair of wheels for driving the running are stopped. This state is maintained until the potential voltage from the rotational potentiometer over the standard potential voltage becomes a defined value.

Further, the CPU 22 has a steering control function for automatically swirling in a circumferential direction of the pipe within which the running apparatus runs on the basis of each of the data d1, d2, d3 and d4 of the angle of incline (the potential voltage). The control program of the steering control function calculates, for example, for increasing a rotational speed of the motors M2 and M3 and reducing a rotational speed of the motors M1 and M4 so that the following formulas are established.

$$V[1]=[STANDARD\ SPEED]+k\Delta Va \quad (11)$$
$$V[2]=[STANDARD\ SPEED]+k\Delta Vb \quad (12)$$
$$V[3]=[STANDARD\ SPEED]+k\Delta Va \quad (13)$$
$$V[4]=[STANDARD\ SPEED]-k\Delta Va \quad (14)$$

Accordingly, since a rotational force due to a difference in the speed is generated and the steering motion can be performed, it is not necessary to newly provide a steering mechanism.

Since the D/A converter 23 is connected to each of the motors M1, M2, M3 and M4 corresponding to the rotational potentiometers P1, P2, P3 and P4, an analog motor control data corresponding to the data d1 of the angle of incline output from the rotational potentiometer P1, an analog motor control data corresponding to the data d2 of the angle of incline output from the rotational potentiometer P2, an analog motor control data corresponding to the data d3 of the angle of incline output from the rotational potentiometer P3 and an analog motor control data corresponding to the data d4 of the angle of incline output from the rotational potentiometer P4 are output from the motors M1, M2, M3 and M4, respectively.

Further, the attitude control portion 20 is connected to a controller 30 provided in the ground station by a control cable 31. A control switch is provided in the controller 30, which can instruct the running of the self-propelled vehicle, manually return the attitude and operate a steering.

An operation of the running apparatus within the pipe structured in the above manner will be described below with reference to FIGS. 8, 9, 10 and 11 showing flow charts.

Figure 8:
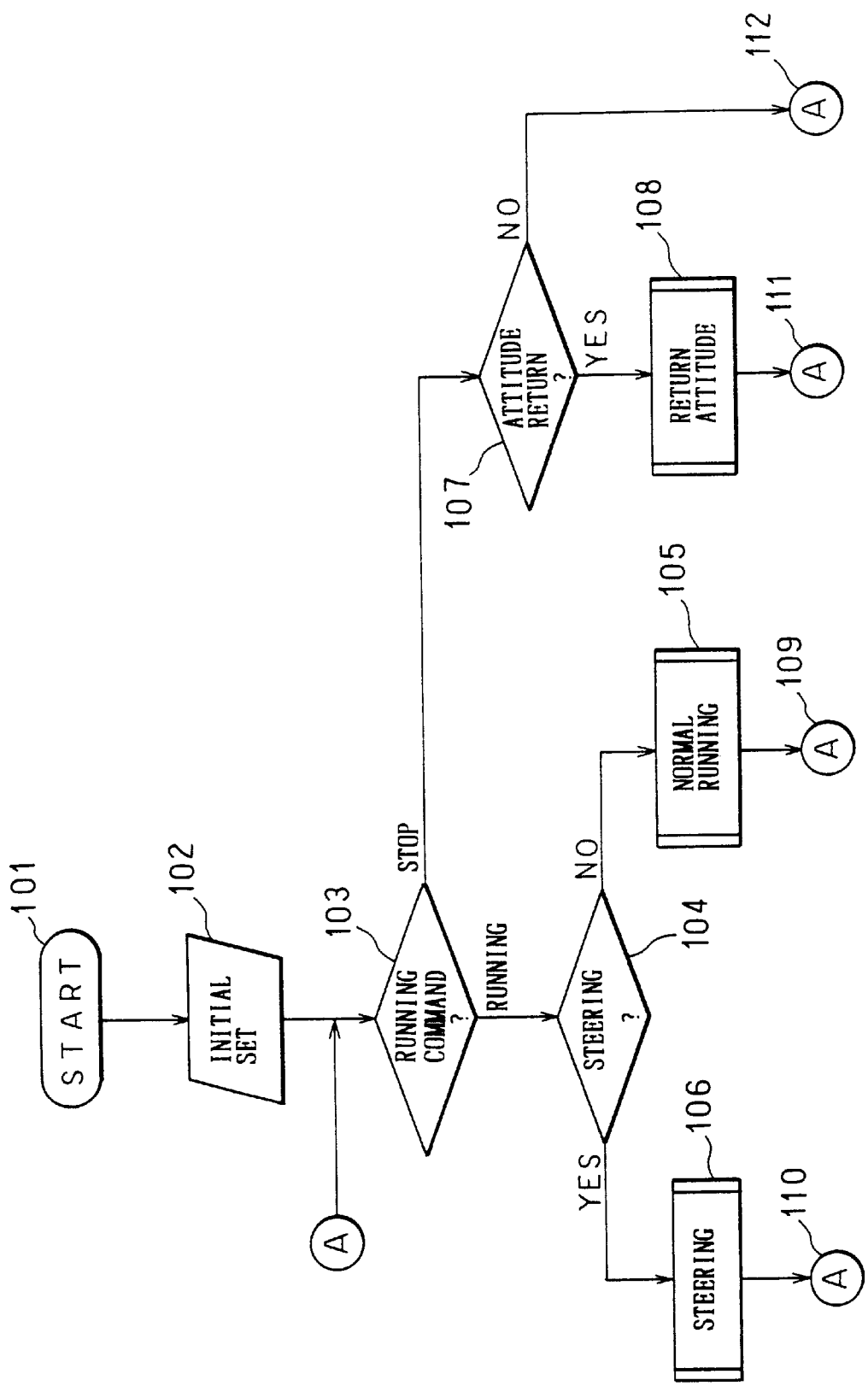
FIG. 8 is a flow chart which shows a basis control system of an attitude control portion.

When the running apparatus within the pipe is started by the controller 30 as shown in FIG. 8 (a step 101), the attitude control portion 20 is initially set (a step 102). In this state, when the running command is output from the controller 30, the self-propelled vehicle starts running (a step 103). The attitude control portion 20 makes the self-propelled vehicle to normally run in the case that the data d1, d2, d3 and d4 of the angle of incline (the potential voltage) output from the respective rotational potentiometers P1, P2, P3 and P4 provided in the self-propelled vehicle are changed in a range equal to or less than a fixed level with respect to a predetermined standard potential voltage (steps 104 and 105).

Figure 9:
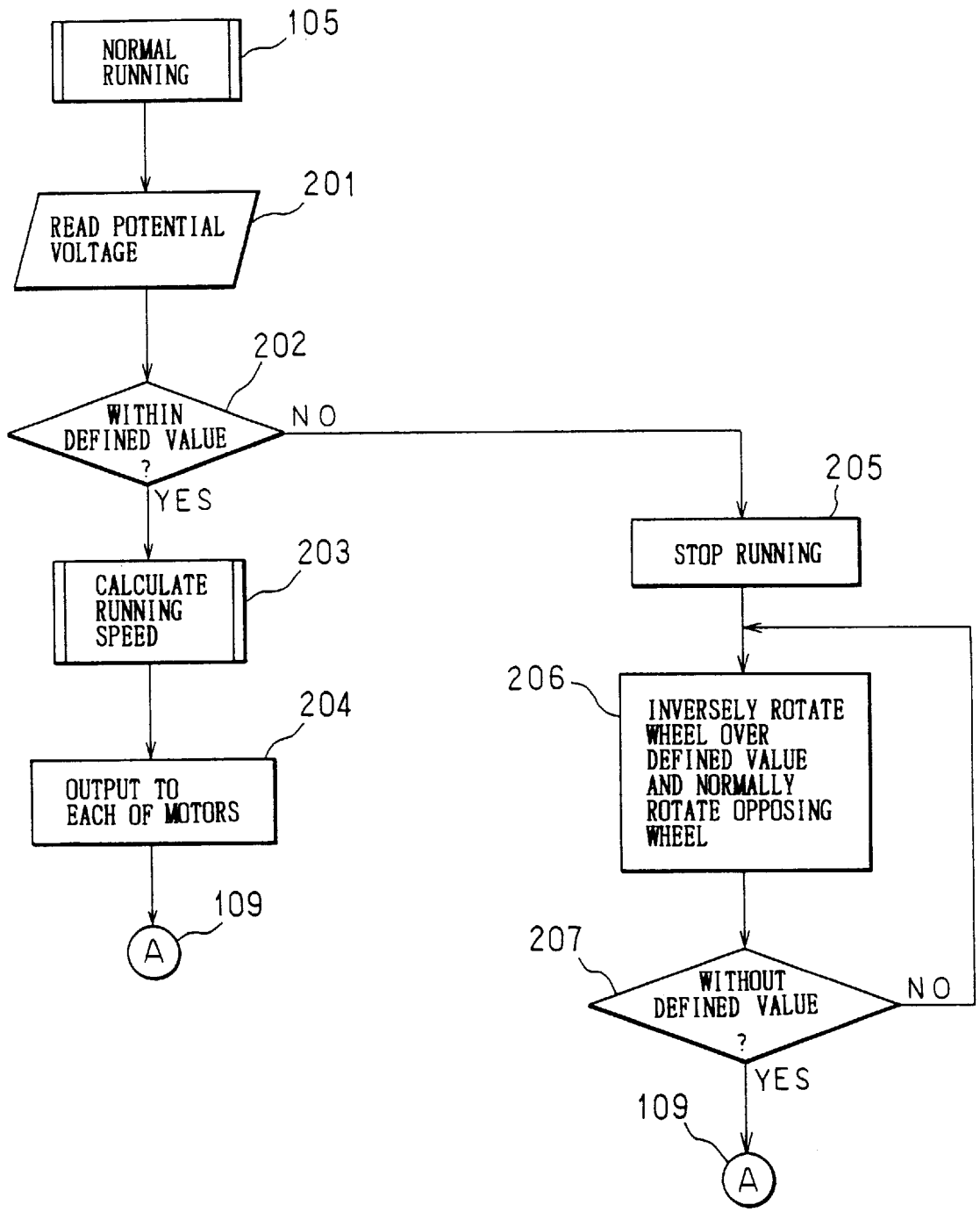
FIG. 9 is a flow chart which shows a control system of an attitude control portion at a normal running.
Figure 10:
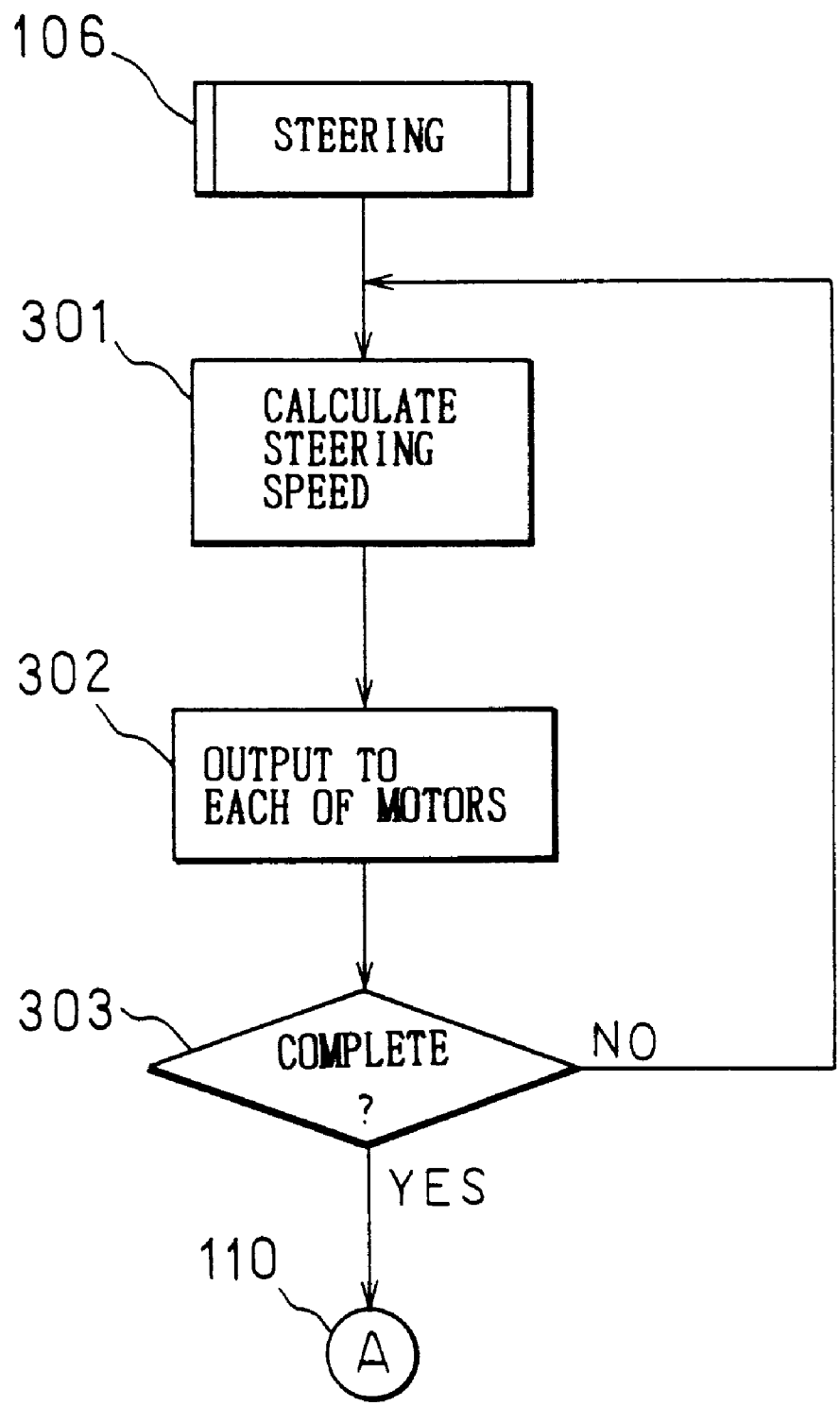
FIG. 10 is a flow chart which shows a control system of an attitude control portion at a steering.

In the case of making the self-propelled vehicle to normally run, as shown in FIG. 9, the attitude control portion 20 reads the data d1, d2, d3 and d4 of the angle of incline (the potential voltage) output from the respective rotational potentiometers P1, P2, P3 and P4 (a step 201), and when they are within a defined value for a normal running, calculates on the basis of the control program of the attitude control function so as to output to each of the Motors M1, M2, M3 and M4 (steps 202, 203 and 204). Each of the wheels for driving the running 5 is driven on the basis of the output data, whereby the main body 1 of the running apparatus can be automatically propelled at the straight pipe portion within the pipe in a state of being directed to an axial direction of the pipe.

On the contrary, in the case of being over the defined value for a normal running, the self-propelled vehicle is stopped (a step 205), the wheel for driving the running controlled by the potential voltage from the rotational potentiometer being over the defined value is detected in accordance with the control program of the attitude return control function, a calculation is performed in accordance with the formulas (7), (8), (9) and (10), the wheel for driving the running is normally rotated, and the opposite wheel for driving the running is counter rotated. At this time, the other pair of wheels for driving the running are stopped. This state is maintained until the defined value (steps 206 and 207).

Further, the attitude control portion 20 makes the self-propelled vehicle to perform a steering operation when the data d1, d2, d3 and d4 of the angle of incline (the potential voltage) output from the respective rotational potentiometers P1, P2, P3 and P4 provided in the self-propelled vehicle correspond to the data for requiring the steering operation (steps 104 and 106). The steering operation drives each of the motors M1, M2, M3 and M4 as shown in FIG.

10 in accordance with the output data calculated on the basis of the formulas (11), (12), (13) and (14) by the control program of the steering control function, and is performed until the main body 1 of the running apparatus swirls in a predetermined direction (steps 301, 302 and 303).

Here, in the case of manually perform the attitude return (a step 107), the attitude is returned by controlling the external command control function of the CPU 22 in the attitude control portion 20 by means of the control switch in the controller 30 and driving each of the motors M1, M2, M3 and M4 so as to become the formulas (7), (8), (9) and (10) as shown in FIG. 11 (steps 108 and 401). Further, in some cases, when driving each of the wheels for driving the running so that an angle measured by the angle measuring mechanism in each of a pair of opposing wheel supporting arms becomes a fixed rate, the main body of the running apparatus can be made in a state of being a predetermined angle inclined from the axial direction of the pipe, so that the main body of the running apparatus running in the inclined state or running to the axial direction of the pipe can be inclined at a desired portion.

Further, a rotary encoder corresponding to measuring means for measuring a moving distance of the self-propelled vehicle may be provided in the wheel for driving the running 5. In particular, as shown in FIG. 6, since the information concerning the pipe passage can be stored in the CPU 22 by providing a counter 41 connected to a rotary encoder 40 provided in the wheel for driving the running 5 and counting output pulses output from the rotary encoder 40 so as to output to the CPU 22, a shape of the pipe passage can be calculated. Accordingly, even in the case that the pipe is old or the history of changing the pipe is not definite, the shape of the pipe passage can be accurately understood.

Still further, in the case that two self-propelled vehicles are connected, since the data of a control condition indicating that the attitude of one of the self-propelled vehicles is now controlled can be sent to the other of the self-propelled vehicles by connecting the CPU 22 of the attitude control portion 20 in each of the self-propelled vehicles, the other of the self-propelled vehicles can wait in a stop state until the attitude of one of the self-propelled vehicles is completely returned.

As mentioned above, in accordance with the running apparatus within the pipe of the invention, since the wheels for driving the running can be automatically controlled, the center axis of the main body of the running apparatus can be always coincided with the center axis of the pipe during the running, and can be smoothly propelled within the curved pipe. Accordingly, a running performance can be improved in comparison with the conventional running apparatus within the pipe.

FIG. 1

| 20 | ATTITUDE CONTROL PORTION |

FIG. 6

| P1 | POTENTIOMETER |
| P2 | POTENTIOMETER |
| P3 | POTENTIOMETER |
| P4 | POTENTIOMETER |
| CHANNEL SELECT | |
| 21 | A/D CONVERTER |
| 23 | D/A CONVERTER |
| M1 | MOTOR |
| M2 | MOTOR |
| M3 | MOTOR |

-continued

| M4 | MOTOR |
| 40 | ROTARY ENCODER |
| 41 | COUNTER |
| SERIAL/PARALLEL CONVERSION | |
| PARALLEL/SERIAL CONVERSION | |
| 30 | CONTROLLER |
| ROBOT SIDE (OVERHEAD STATION) | |
| CONTROLLER SIDE (GROUND STATION) | |
| RUNNING COMMAND | |
| STEERING | |
| ATTITUDE RETURN | |
| SWITCH INPUT | |

FIG. 7

INVERSE ROTATION
NORNAL ROTATION
DIRECTION OF ADVANCE

FIG. 8

| 102 | INITIAL SET |
| 103 | RUNNING COMMAND ? |
| 104 | STEERING ? |
| 105 | NORMAL RUNNING |
| 106 | STEERING |
| 107 | ATTITUDE RETURN ? |
| 108 | RETURN ATTITUDE |

FIG. 9

| 105 | NORMAL RUNNING |
| 201 | READ POTENTIAL VOLTAGE |
| 202 | WITHIN DEFINED VALUE ? |
| 203 | CALCULATE RUNNING SPEED |
| 204 | OUTPUT TO EACH OF MOTORS |
| 205 | STOP RUNNING |
| 206 | INVERSELY ROTATE WHEEL OVER DEFINED VALUE AND NORMALLY ROTATE OPPOSING WHEEL |
| 207 | WITHOUT DEFINED VALUE ? |

FIG. 10

| 106 | STEERING |
| 301 | CALCULATE STEERING SPEED |
| 302 | OUTPUT TO EACH OF MOTORS |
| 303 | COMPLETE ? |

FIG. 11

| 108 | RETURN ATTITUDE |
| 401 | DRIVE MOTORS SO AS TO ESTABLISH THE FOLLOWING FORMULAS |

What is claimed is:

1. A self-propelled vehicle for running within a pipe comprising:

a main body of a running apparatus;

two pairs of wheel supporting arms arranged on an outer periphery of the main body of said running apparatus in a perpendicular state and having an end rotatably fixed to an end portion of said main body of the running apparatus;

a wheel for driving the vehicle fixed to each of the other ends of said two pairs of wheel supporting arms and rotated by a drive mechanism;

an interlocking mechanism provided with a spring for urging said two pairs of wheel supporting arms to which said wheels for driving the vehicle are fixed in such a manner as to open around said one end of said main body of the running apparatus;

an angle measuring mechanism for measuring an angle of incline of each of said two pairs of wheel supporting arms opened by said interlocking mechanism so as to output a data of an angle of incline; and an attitude control portion for returning an attitude of said main body of the running apparatus to a normal attitude state by controlling said drive mechanism for rotating said wheel for driving the vehicle on the basis of said data of the angle of incline with respect to each of said two pairs of wheel supporting arms output from said angle measuring mechanism.

2. A self-propelled vehicle for running within a pipe as claimed in claim 1, wherein said attitude control portion has an attitude returning control function for automatically correcting the attitude of said main body of the running apparatus in parallel to the pipe axis of the pipe within which the running apparatus runs on the basis of said data of the angle of incline.

3. A self-propelled vehicle for running within a pipe as claimed in claim 1, wherein said attitude control portion has a steering control function for automatically swinging said main body of the running apparatus in a circumferential direction of the pipe within which the running apparatus runs on the basis of said data of the angle of incline.

4. A self-propelled vehicle for running within a pipe as claimed in claim 1, wherein said attitude control portion has an external command control function for controlling said drive mechanism for rotating s aid wheel for driving the vehicle on the basis of a command from an external portion.

5. A self-propelled vehicle for running within a pipe as claimed in claim 1, wherein said angle measuring mechanism comprises a rotational potentiometer fixed to each of said two pairs of wheel supporting arms, an arm for measuring an angle axially attached to a rotational axis of said rotational potentiometer and projected from each of said wheel supporting arms, a roller for measuring an angle rotatably fixed to a front end portion of said arm for measuring the angle and a spring for always urging said arm for measuring the angle to a predetermined rotational direction around a rotational axis of said rotational potentiometer so as to pressure contact said roller for measuring the angle to a wall of the pipe within which the running apparatus runs.

6. A self-propelled vehicle for running within a pipe as claimed in claim 1, wherein measuring means for measuring a moving distance of said self-propelled vehicle is provided in said wheel for driving the vehicle.

7. A self-propelled vehicle for running within a pipe as claimed in claim 1, wherein in the case that a plurality of said self-propelled vehicles are connected, said attitude control portion of each of said self-propelled vehicles is connected to each other so as to send and receive a control signal.

* * * * *

UNITED STATES PATENT AND TRADEMARK OFFICE
CERTIFICATE OF CORRECTION

PATENT NO. : 6,123,027
DATED : September 26, 2000
INVENTOR(S) : Suyama et al.

It is certified that error appears in the above-identified patent and that said Letters Patent is hereby corrected as shown below:

Column 7,
Line 61, (Formula (13)), "$V[3]=[STANDARD\ SPEED]+k_\Delta Va$" should read
-- $V[3]=[STANDARD\ SPEED]-k_\Delta Va$ --.

Column 11,
Line 21, "s aid" should read -- said --.

Signed and Sealed this

First Day of January, 2002

Attest:

JAMES E. ROGAN
*Director of the United States Patent and Trademark Office*

*Attesting Officer*